(12) United States Patent
Golosovker et al.

(10) Patent No.: US 8,359,593 B2
(45) Date of Patent: Jan. 22, 2013

(54) COMPUTER MACHINE MIGRATION OF FILE SYSTEM IMAGES USING A REDO-LOG FILE

(75) Inventors: Victor V. Golosovker, San Jose, CA (US); Ilya Languev, Santa Cruz, CA (US); Sirish Raghuram, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1173 days.

(21) Appl. No.: 12/106,736

(22) Filed: Apr. 21, 2008

(65) Prior Publication Data

US 2009/0265706 A1    Oct. 22, 2009

(51) Int. Cl.
*G06F 9/455* (2006.01)

(52) U.S. Cl. .......................................... 718/1
(58) Field of Classification Search ................. None
See application file for complete search history.

(56) References Cited

U.S. PATENT DOCUMENTS

| | | | |
|---|---|---|---|
| 7,185,032 B2 * | 2/2007 | Rudoff ........................ 707/759 |
| 7,376,805 B2 | 5/2008 | Stroberger et al. |
| 7,533,229 B1 | 5/2009 | van Rietschote |
| 7,624,260 B2 * | 11/2009 | Ethier et al. ..................... 713/2 |
| 7,761,573 B2 | 7/2010 | Travostino et al. |
| 7,900,005 B2 * | 3/2011 | Kotsovinos et al. .......... 711/162 |
| 7,966,614 B2 | 6/2011 | Chodroff et al. |
| 7,984,262 B2 * | 7/2011 | Battista et al. ................ 711/173 |
| 8,239,646 B2 | 8/2012 | Colbert et al. |
| 2003/0188229 A1 | 10/2003 | Lubbers et al. |
| 2004/0010787 A1 | 1/2004 | Traut et al. |
| 2005/0262181 A1 | 11/2005 | Schmidt et al. |
| 2006/0010176 A1 | 1/2006 | Armington |
| 2006/0089995 A1 | 4/2006 | Kerr et al. |
| 2006/0155735 A1 | 7/2006 | Traut et al. |
| 2009/0037680 A1 | 2/2009 | Colbert et al. |

OTHER PUBLICATIONS

Powerconvert, http://www.platespin.com/products/powerconvert/.
VMware Converter, http://vmware.com/files/pdf/converter_datasheet.pdf.
Shadowsurfer, http://www.storagecraft.com/documents/SecurityDataSheet.pdf.
Volume Snapshot Manager, http://www.storagecraft.com/documents/VSMdsheet.pdf.
Migrate Easy, http://www.acronis.com/homecomputing/products/migrateeasy/.
True Image, http://www.acronis.com/homecomputing/products/trueimage/.
Osten Kit Colbert et al., "Online Virtual Machine Disk Migration", U.S. Appl. No. 13/546,096, filed Jul. 11, 2012.

(Continued)

*Primary Examiner* — Meng An
*Assistant Examiner* — Eric C Wai

(57) ABSTRACT

Systems and methods for migration between computing machines are disclosed. The source and target machines can be either physical or virtual; the source can also be a machine image. The target machine is connected to a snapshot or image of the source machine file system, and a redo-log file is created on the file system associated with the target machine. The target machine begins operation by reading data directly from the snapshot or image of the source machine file system. Thereafter, all writes are made to the redo-log file, and subsequent reads are made from the redo-log file if it contains data for the requested sector or from the snapshot or image if it does not. The source machine continues to be able to run separately and simultaneously after the target machine begins operation.

17 Claims, 1 Drawing Sheet

OTHER PUBLICATIONS

"Constantine P. Sapuntzakis, et al., "Optimizing the Migration of Virtual Computers," USENIX, Proceedings of the 5th Symposium on Operating Systems Design and Implementation, Boston, Massachusetts, USA, Dec. 2002".

Michael Nelson, et al., "Fast Transparent Migration for Virtual Machines," 2005 USENIX Annual Technical Conference, Palo Alto, California, USA, pp. 391-394, 2005.

Dejan S. Milojicic, et al., "Process Migration," ACM Computing Surveys, vol. 32, No. 3, pp. 241-299, Sep. 2000.

Powerconvert, http://www.platespin.com/products/powerconvert/, retrieved 2008.

VMware Converter, http://vmware.com/files/pdf/converter_datasheet.pdf, retrieved 2008.

Shadowsurfer, http://www.storagecraft.com/documents/SecurityDataSheet.pdf, retrieved 2008.

Volume Snapshot Manager, http://www.storagecraft.com/documents/VSMdsheet.pdf, retrieved 2008.

Migrate Easy, http://www.acronis.com/homecomputing/products/migrateeasy/, retrieved 2008.

True Image, http://www.acronis.com/homecomputing/products/trueimage/, retrieved 2008.

* cited by examiner

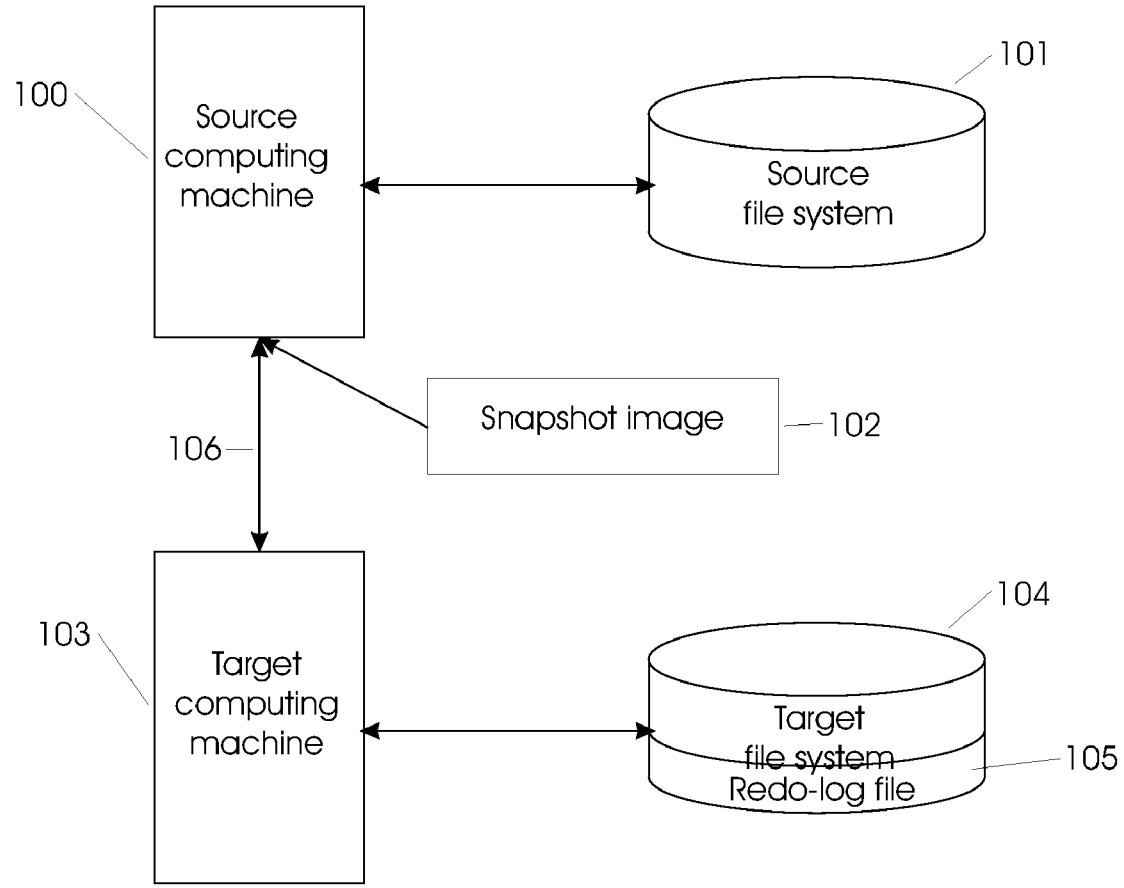

COMPUTER MACHINE MIGRATION OF FILE SYSTEM IMAGES USING A REDO-LOG FILE

FIELD OF THE INVENTION

Embodiments of the present invention relate to the field of computer software and mechanisms for moving running software between two computing machines. More specifically, embodiments of the present invention are directed to a technology for starting up a computing machine based on software previously running on a different computing machine.

BACKGROUND

A virtual machine (VM) is a software abstraction, or "virtualization," of an actual physical computer system. Each VM typically mimics the general structure of a physical computer and as such will usually have both virtual system hardware and guest system software. The virtual system hardware typically includes at least one virtual CPU, virtual memory, at least one storage device such as a virtual disk, and one or more virtual devices. All of the virtual hardware components of the VM can be implemented in software to emulate corresponding physical components. The guest system software typically includes a guest operating system and drivers as needed.

An advantage of virtual machine technology is an ability to run multiple virtual machines on a single host platform. Frequently, rather than starting up a new virtual machine from scratch by allocating resources for it, loading and booting an operating system, and then loading and starting specific applications, system operators find it useful to create new working virtual machines that are copies of running machines (either physical or virtual). To start up a virtual machine in this way, a typical process starts with the creation of a new virtual machine on a suitable host. Thereafter, the process is different from conventional machine startup. To clone the contents of a live physical source machine, a "snapshot" of the source machine file system is taken, typically with the aid of software residing on the source machine. The snapshot provides an image of the complete state of the source machine file system at a moment in time. Typically, it does not involve physically copying all of the memory to new locations. Instead, after the time of the snapshot, all file changes are made to new copies of the changed files, and the pre-snapshot versions of all files, including subsequently deleted files, are preserved. In normal operation, the source machine operating system and application software see only the new version of the file system. Access to the snapshot version is typically made available only by rebooting the machine in a special roll-back or recovery mode. File-system snapshot capabilities have been built into versions of the MICROSOFT® WINDOWS® operating system since about 2003. Third-party snapshot software is also available from, for example, ACRONIS® Inc. and STORAGECRAFT™ Technology Corporation. Snapshot techniques are also useful to allow the copying of a source machine to a new virtual machine.

Snapshot techniques were originally developed to support various backup, roll-back, and recovery functions, but they can also be used for "sandbox" functions. Sandbox functionality allows testing of new ideas, patches and the like while preserving the option of restoring a previous known machine configuration. In a sandbox application, a user may want to test some software changes before committing to them or run an application without leaving a trace of his/her activities. By running a VM using the snapshot version of the file system, s/he can ensure that changes are functioning properly while retaining the option to go back to a known working configuration. S/he can also run an application such as a web browser that normally leaves records of activity, and then restore the system to a state as if s/he had never run the application. In these applications, the machine must be rebooted to run on either the snapshot version of the file system or the regular version. Such uses of snapshot techniques are not widely practiced, but at least one product exists to support them: SHADOWSURFER™ from STORAGECRAFT™ Technology Corporation.

In order for a new VM to make use of the snapshot image of the source machine, it is cloned to storage associated with new virtual machine. There are many ways of performing this cloning operation. In a typical computing environment, the new VM is connected to the source machine over a network, and the data are transferred over that network. The VM memory can be local (such as all or a portion of a disk drive attached directly to the physical machine which hosts the VM), or it can be located remotely, for example, in a Storage Area Network (SAN) accessible from the VM. Regardless of the specific hardware and software details, the cloning operation can take a considerable amount of time. The amount of time will vary according to the implementation details, the resulting average data transfer rates, and the size of the source machine file system that must be transferred. For typical machines and networks in common use in 2008, the size of the source file system can be 50 GB or more, and typical average data transfer rates can be about 20 MB/s. Thus, a complete cloning operation can take at least 2500 seconds or about 40 minutes. Significantly longer times are not uncommon, especially for servers running data-intensive applications that can have much larger file systems.

After data transfer is completed, the data may need to be adapted to function in a virtual environment. These changes are typically related to operating system files, especially device drivers and the like, which need to be modified to connect to specific hardware or memory locations in the new VM.

Once the source file system image has been cloned to the new VM storage, the new VM has all the information it needs to pick up where the source machine left off at the time of the file system snapshot. This complete process is well-known and is commonly referred to as "P2V Conversion" ("physical-to-virtual" conversion), although the source machine need not necessarily be a physical machine. Software to support bringing up new VMs that are cloned from source machines as described above is available from various vendors. Examples include VMWARE CONVERTER™ and P2VASSISTANT™ (now discontinued) from VMWARE®, Inc. and POWERCONVERT™ from PLATESPIN™ Ltd. Similar functionality is also described in U.S. patent applications by Armington (application Ser. No. 10/869,730) and by Kerr et al. (application Ser. No. 11/257,009).

A problem that can arise for certain applications of computing machine migration is that the long time required to complete the migration can result in significant downtime for critical computing services. One example arises for servers that process customer transactions or other user business which cannot tolerate downtime, and where server data are continually changing. In order to switch operations from an original source machine to a new VM, it is typically necessary to disable user interaction from the time that a snapshot of the source file system is taken until the new VM can take over, a period that can easily extend to several hours depending on the amount of data that must be copied and the available data transmission rate. While it is generally possible to leave the source machine running after the snapshot and during the copying operation ("live" computing machine migration), such a process may be acceptable only for servers providing static data.

The conversion process or data copying may also fail (for example, due to a networking problem), or the new target VM may not boot because of an incompatibility with the virtual environment. In such a case, the user would not know whether the conversion has succeeded until the end of the process, possibly several hours later.

In other applications, the new VM is used only for testing purposes such as "sandbox" testing of new ideas (e.g., software patches and service packs) or system administrator diagnosis of a reported problem. In these cases, it is advantageous to use a VM clone of a physical machine as a "safe" copy. In these applications as well, it is frequently undesirable to wait for the file system copying operation to be completed. Critical time may be lost and system administrator productivity may be impaired.

When VM technology in general and computing machine migration in particular are being demonstrated for new customers, it is better to use a customer machine as the source to provide a workload that the potential customer already understands. However, for large source systems, the time required to copy the source system files can be prohibitive and such demonstrations would not be practical without instant migration technology.

SUMMARY

Systems and methods for migration between computing machines are disclosed. The source and target machines can be either physical or virtual; the source can also be a machine image. The target machine is connected to a snapshot or image of the source machine file system, and a redo-log file is created on the file system associated with the target machine. The target machine begins operation by reading data directly from the snapshot or image of the source machine file system. Thereafter, all writes are made to the redo-log file, and subsequent reads are made from the redo-log file if it contains data for the requested sector or from the snapshot or image if it does not. The source machine continues to be able to run separately and simultaneously after the target machine begins operation.

BRIEF DESCRIPTION OF THE DRAWING

FIG. 1 shows a schematic diagram of instant computing machine migration.

DETAILED DESCRIPTION

Reference will now be made in detail to embodiments of the present technology for computing machine migration, an example of which is illustrated in the accompanying drawing. While the technology for computing machine migration will be described in conjunction with various embodiments, it will be understood that they are not intended to limit the present invention to these embodiments. On the contrary, the technology for computing machine migration is intended to cover alternatives, modifications and equivalents, which may be included within the spirit and scope of the invention as defined by the appended claims. Furthermore, in the following detailed description, numerous specific details are set forth in order to provide a thorough understanding of the present invention. However, embodiments of the present invention may be practiced without these specific details. In other instances, well known methods, procedures, and components have not been described in detail so as not to unnecessarily obscure aspects of the present embodiments.

Unless specifically stated otherwise as apparent from the following discussions, it is appreciated that throughout the present detailed description, discussions utilizing terms such as "accessing," "scanning," "determining," "applying," "generating," "utilizing," "storing," "causing," "coupling," "employing," "performing," "providing," "interfacing," "detecting," "creating," "coordinating," "scheduling," and "updating," or the like, refer to the actions and processes of a computer system, or similar electronic computing devices. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present invention are also well suited to the use of other computer systems such as, for example, optical computers.

For concreteness, specific embodiments of computing machine migration are described wherein the source machine is a physical machine with a locally attached disk file system, and the target machine is a VM with associated virtual disk(s). This version of computing machine migration is also known as "P2V conversion." However, unless the specific context does not permit, it is understood that the source machine can also be a virtual machine or a machine image (a snapshot or backup of the source file system volume(s)). Similarly the destination machine can also be a physical machine. Both source and destination machines can have file systems that are either locally attached or remote but accessible over a network or other communications channel.

The following specific definitions apply to terms and phrases used throughout this specification and claims:

Computing machine migration: migrating the functionality of a source computing machine to a new machine. A common example is P2V conversion, but in alternative embodiments the source can be physical or virtual, and the source file data can be a freshly captured snapshot of the source file system or a previous machine image or backup copy. Similarly, the target machine can be either physical or virtual.

Live computing machine migration: computing machine migration performed without powering off or rebooting the source physical machine.

Instant computing machine migration: computing machine migration wherein the target machine is able to begin operation by accessing source machine file system memory without first copying it to a new location.

VM: a "virtual machine" which is a software abstraction, or "virtualization," of an actual physical computer system. A "hypervisor" is often used to create and manage a VM, although there are other names used for some types of software that create and manage VMs.

P2V conversion: migrating a source physical machine to a new target VM. "P2V" is a shorthand notation for "physical-to-virtual."

Live P2V conversion: P2V conversion performed without disabling user interaction with the source machine.

Snapshot: an image of the complete state of a source machine file system or a file system volume at a moment in time. A snapshot is usually not a physical copy. Typically, in using snapshots, after the snapshot is created, all file changes are made to new copies of files, and the pre-snapshot versions of all files, including subsequently deleted files, are preserved. In normal operation, the source machine operating system and application software see only the new version of the file system. The preserved snapshot version of files is made available via special operation system calls.

Migration streaming: a background process running after instant computing machine migration to copy the source file system to the target VM. Such a process can reside on the source machine (a data "push" process), the target machine (a data "pull" process), or on a third machine connected to the same network as the source and target. A synonym for migration streaming in the case where the source machine is physical and the destination machine is virtual is P2V streaming.

Sandbox: a VM which is a usually temporary copy of a source machine intended for example and without limitation, for experimental testing of new ideas, software patches, and service packs before implementation on the "real" machine.

Redo-log file: a collection of data in one or more files on the target machine file system where file system writes are made after instant computing machine migration.

Hypervisor: a software program which manages the creation and running of VMs.

To Clone: to copy a file system from a source machine to a target machine with changes if necessary to adapt or reconfigure the functionality of the associated software to the configuration of the target machine.

File system: a collection of storage organized as a set of "files," each consisting of one or more sectors, typically with a hierarchical "directory" or "folder" structure resident on one or more "volumes." The physical type of storage used can vary. Magnetic and optical disks are commonly used, and a "volume" may represent a physical disk, although other arrangements are also possible. Other forms of physical storage such as flash memory can also be used. File systems are usually, but need not be, stored in some form of nonvolatile storage. At least a portion of the file system associated with a particular computing machine is typically connected locally such that high-speed communications are possible, but file systems can also use storage that is connected to remote machines or directly to a network (as a Storage Area Network, for example).

Sector: the smallest unit of storage that can be read from or written to a file system. For typical magnetic-disk-based file systems, the size of a sector is 512 bytes.

Instant computing machine migration greatly speeds up the process of creating a fully-functional target VM. A new VM can be created and be ready to run in just a few minutes. Initially, the new VM uses a snapshot image of the source file system for reads. A redo-log file on the target machine is created and used for all file system writes. Thus, any changes to the file system made by the new target machine are made in local copies of the affected file system sectors and not in the snapshot image on the source machine (which can be, and typically is, maintained in a read-only state). Subsequent reads are made from the redo-log file for any file system sectors that have been written there. That is, if a particular file system sector has been written into the redo-log file, then that version of the sector is used rather than the one present in the snapshot image on the source machine. Optionally, the full contents of the source file system can be transferred and converted into the native file-system format of the target in a background process while the target VM (and optionally the source machine) are running.

Continuing now to describe the steps of instant computing system migration in more detail, we first look at the process of creating a suitable snapshot image. Referring to FIG. 1, to make sure that the source data remains consistent and unaffected by any ongoing modifications by the running source computing machine 100, a file system snapshot 102 is taken for each volume of the source file system 101. In instant computing machine migration, the target computing machine 103 (for example, a VM) uses these snapshots directly for performing reads for any file system sectors that have not been previously read or modified, at least until background migration streaming is complete.

The snapshots can be created using either software provided by the source operating system or by a third party. For example, when the source machine uses the WINDOWS XP®, 2003 or VISTA® operating systems, VSS (VISUAL SOURCE SAFE™) can be used to create a snapshot. The snapshot is exposed to the operating system as a volume device with a name like \\?\GLOBALROOT\Device\HarddiskVolumeShadowCopy<N>name. As another example, for a source machine using the Linux or BSD Unix operating systems, LVM (Logical Volume Manager) snapshots can be used. Similarly, for a source machine using the SOLARIS™ or MAC OS X™ operating systems, ZFS snapshots can be used. (ZFS originally stood for "Zettabyte File System" originally developed by SUN® Microsystems, Inc. for SOLARIS; the initials are now commonly used.) Third-party snapshot software is also available: for example, TRUE IMAGE™ from ACRONIS® Inc. and VOLUME SNAPSHOT MANAGER™ from STORAGECRAFT™ Technology Corporation.

It is also possible to use a machine image such as might be stored for backup purposes as the source file system for instant computing machine migration. In this case, the operation of the original source machine is not relevant, since a separate copy has been made and stored. The target machine for the instant computing machine migration is connected to the machine image, typically via a network connection 106 between the source and target computing machines 100 and 103 respectively.

The target computing machine 103 can be either physical or virtual. By way of example, a hypervisor can be used to create a new VM as a target computing machine by allocating resources for it on a physical machine remote from the source computing machine, but connected to it over a network. One can now use instant computing machine migration to instantly "fork" the source computing machine into two running copies of the same machine. The original source computing machine 100 can continue to run and modify its file system. The new target computing machine 103 (for example, the target VM) reads initially from the source system snapshot 102. Of course, once it has begun operation, the target VM will also need to be able to modify the file system. When the target VM need to write to the file system, it cannot modify the source system files, and such writes must be made instead to local copies of the affected sectors. These can be stored in a "redo-log file" 105 on the file system 104 associated with the target VM. (The name "redo-log file" is used by analogy with similar storage structures that allow rollbacks to historic versions for problem recovery in other storage management systems.) The redo-log file functionality can also be implemented as multiple files, and it can be stored directly in system memory rather than the file system. Redo-log files can also exist in multiple layers, when a cloned file system is subsequently cloned additional times. Subsequent reads are made from the re-do log file 105 for any sectors that exist therein and from the source system snapshot 102 for any that do not.

Computing machine migration can be either "local" or "remote." It is "local" if the target VM is created directly on the source computing machine and managed, for example, using a hypervisor running on the source. In this case, the source data is local relative to the target VM and reads from the source file system snapshots are performed using the native services of the source operating system. Note that local computing machine migration creates two running "machines," the original physical machine and a target VM hosted on the same physical hardware. In other words, for local P2V conversion (as such computing machine migration is most likely to be), the target VM 103 is running on the same computing hardware as the source physical machine 100. These two machines can coexist and appear to users as two independently operating machines. The process of creating and starting a virtual clone of the original machine is described as "instant" when it is not necessary to stop the physical machine and reboot as would be necessary in typical prior art usage of file system snapshots.

The target VM can also be created on a physical machine remote from the source machine. In this case, the process is described as "remote" computing machine migration. The target VM can be created and managed, for example, by a hypervisor located on the remote physical machine and the source data is remote to the target VM. The source data can be made available via a network data transfer protocol such as iSCSI or FibreChannel, although any suitable means can be used to provide a data connection between the source data and the target VM. Data transfer for remote instant computing machine migration may be much slower than is possible for local migration, but the target VM does not need a complete copy of the source file system in its own virtual disk memory (file system) to begin useful operation. Instant computing machine migration allows the target VM to begin operation immediately while the copying of the source file system proceeds as a background task.

In some embodiments, it can also be advantageous to cache the results of VM file system reads that are made from the source file system image for more rapid subsequent retrieval. Such a cache can be located in the same redo-log file that is used to store file system data that has been modified by the VM. It can also be located in any convenient local storage available to the VM for which higher-speed access is possible than for the remote reads.

Reading the source file system data directly allows a user to quickly create a fully functioning virtual clone of the source machine. In some embodiments, this may be sufficient, as for example, when a target VM is created for a temporary use. In other embodiments, it is advantageous to transfer the full contents of the source file system volume(s) into native files in the file system associated with the target VM. The transfer of complete file system volumes can be performed as a background task after the target VM has begun operation. This background data transfer task is called "migration streaming." It is also known as "P2V streaming" in the special case where the source machine is physical and the target machine is virtual. Migration streaming can be managed by processes located on any convenient machine with control connections to both the source file system snapshot and the target VM file system. Once the transfer is complete, operation of the target VM can continue without further interaction with the source data. If desired, the connection to the source data can then be severed, or the hardware containing the source data can be turned off or replaced.

It is also advantageous to coordinate migration streaming with management of the redo-log file used for storing target machine writes and for caching target machine reads such that file system sectors that have already been transferred to the target file system due to target machine reads are not transferred a second time. This avoids redundant data transfer and ensures that a target VM launched using instant computing machine migration can be ready for independent operation (i.e., with no further need to read from the source machine file system image) almost as quickly as a target VM that does not begin operation until all data had been transferred.

One example use of live instant computing machine migration described above was to create a temporary VM to test out patches and/or service packs. As a further example use, once such testing is complete, it is also possible to use instant computing machine migration in the reverse direction, thereby cloning the temporary VM back into the original source machine. This technique can minimize downtime while allowing system administrators to perform critical testing on a virtual clone of a live running machine. Note that if user interaction is continuing with the source machine while patches are being tested on the temporary VM, it may be necessary to maintain a separate redo-log file on the source machine so that when the two instant computing machine migrations (source to temporary VM, temporary VM back to source) are complete, both the patches and any file-system changes associated with the ongoing user interaction are incorporated in the final running file system configuration.

What is claimed is:

1. A method for migrating software running on a source computing machine to a target computing machine comprising:
   (a) obtaining an image of the file system associated with the source computing machine,
   (b) connecting said image to said target computing machine, wherein said target computing machine is a virtual machine,
   (c) beginning operation of said target computing machine using said data from said image before a complete copy of said file system associated with said source computing machine is copied to a file system of said target computing machine, and
   (d) creating a redo-log file on the file system of said target computing machine,
   wherein said target computing machine performs file-system writes to said redo-log file and performs file-system reads from said redo-log file if said redo-log file contains data for the requested sector or from said image if said redo-log file does not contain data for the requested sector, wherein said source computing machine continues to be able to run separately and simultaneously after the target computing machine begins said operation by reading said data from said image, and wherein, after the target computing machine begins operation, a background process is run to clone the source file system or a portion thereof to the target file system.

2. The method of claim 1, wherein said source computing machine is a physical machine.

3. The method of claim 2, wherein said image is a snapshot of the file system of said physical machine.

4. The method of claim 2, wherein said image is obtained from a stored backup image of the file system of said physical machine.

5. The method of claim 1, wherein said source computing machine is a virtual machine.

6. The method of claim 1, wherein said image is a snapshot.

7. The method of claim 1, wherein said virtual machine is created to run on the same physical computing hardware as the source computing machine.

8. The method of claim 1, wherein said target computing machine is a physical machine executing said virtual machine 9. The method of claim 1, wherein reads from said image are cached by said target computing machine, and subsequent reads from cached sectors are read from the cache.

10. The method of claim 1, further comprising the steps of:
   (e) allowing said target computing machine to make a change to said redo-log file, and
   (f) migrating the modified file system of the target computing machine back to the source computing machine.

11. The method of claim 10, wherein step (e) comprises cloning said change to said redo-log file back into said source file system to replace the corresponding memory locations in said source file system.

12. The method of claim 1, where said source computing machine is a virtual machine, and wherein said source computing machine continues to run separately and simultaneously from the target computing machine before and after the target computing machine begins the operation.

13. A computer system providing migration between computing machines comprising:
   (a) a source computing machine,
   (b) a target computing machine, wherein said target computing machine is a virtual machine.
   (c) software to create a snapshot or image of the source computing machine file system,
   (d) software and a connection to allow said target computing machine to access said snapshot or image and to begin operation by reading data from said snapshot or image before a complete copy of the source computing machine file system is copied to a file system of said target computing machine,
   (e) a redo-log file on the file system of said target computing machine,
   (f) software associated with said target computing machine to manage file-system access such that said target computing machine performs file-system writes to said redo-log file and performs file system reads from said redo-log file if said redo-log file already contains data for the requested sector or from said snapshot or image if said redo-log file does not contain data for the requested sector, and
   (g) a background software process to clone the complete source file system or a portion thereof to the target file system after the target computing machine begins operations.

wherein said source machine continues to be able to run separately and simultaneously after the target machine begins operation by reading said data from said snapshot or image, wherein at least one operation of the computer system is performed using physical computing hardware.

14. The computer system of claim 13, further comprising software to cache reads by said target computing machine from said snapshot or image and to read cached file-system sectors preferentially when present.

15. The computer system of claim 13, wherein said file-system reads from said snapshot or image are performed from (1) a cache of reads of the snapshot or image, (2) a clone of the snapshot or image or a portion thereof, or (3) the snapshot or image, using the first of these alternatives that exists and contains data for the requested sector or sectors.

16. The computer system of claim 13, where said source computing machine is a virtual machine, and wherein said source computing machine continues to run separately and simultaneously from the target computing machine before and after the target computing machine begins the operation.

17. The computer system of claim 13, further comprising software:
   to allow said target computing machine to make a change to said redo-log file, and
   to migrate the modified file system of the target computing machine back to the source computing machine.

* * * * *